No. 681,238. Patented Aug. 27, 1901.
G. F. MESSINGER.
THRESHING MACHINE.
(Application filed Aug. 14, 1900.)
(No Model.) 2 Sheets—Sheet 1.

No. 681,238. Patented Aug. 27, 1901.
G. F. MESSINGER.
THRESHING MACHINE.
(Application filed Aug. 14, 1900.)
(No Model.) 2 Sheets—Sheet 2.

Witnesses
F. L. Ourand
W. Parker Reinohl

Inventor
G. Frank Messinger
By D. C. Reinohl
Attorney

UNITED STATES PATENT OFFICE.

GEORGE FRANK MESSINGER, OF TATAMY, PENNSYLVANIA.

THRESHING-MACHINE.

SPECIFICATION forming part of Letters Patent No. 681,238, dated August 27, 1901.

Application filed August 14, 1900. Serial No. 26,845. (No model.)

*To all whom it may concern:*

Be it known that I, GEORGE FRANK MESSINGER, a citizen of the United States, residing at Tatamy, in the county of Northampton and State of Pennsylvania, have invented certain new and useful Improvements in Threshing-Machines; and I do hereby declare the following to be a full, clear, and exact description of the invention, such as will enable others skilled in the art to which it appertains to make and use the same.

My invention relates to threshing-machines, has especial reference to that class of machines known to the trade as "overshot," and consists in certain improvements in construction of the concave blocks, which will be fully disclosed in the following specification and claims.

Figure 1:
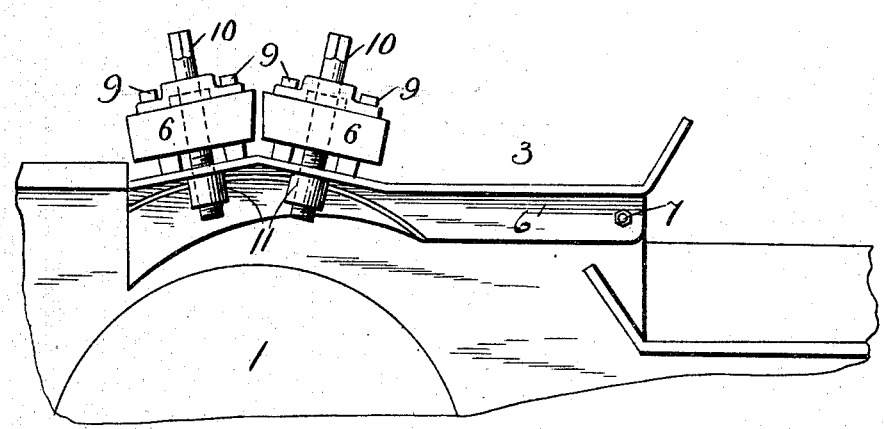
Figure 2:
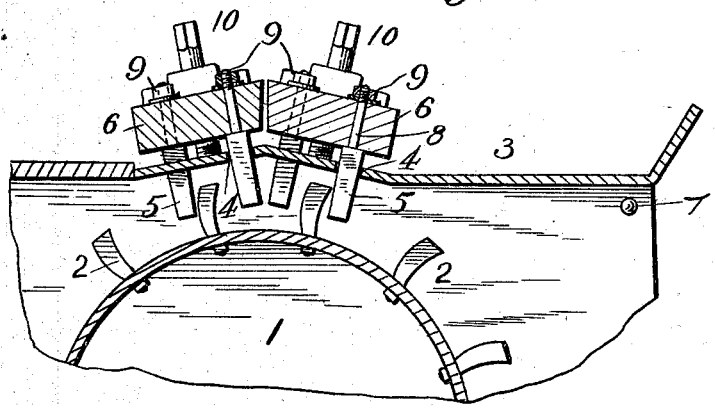
Figure 3:
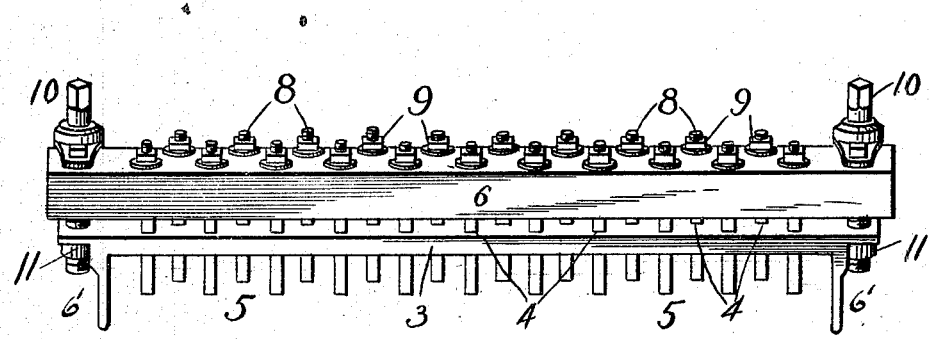
Figure 4:
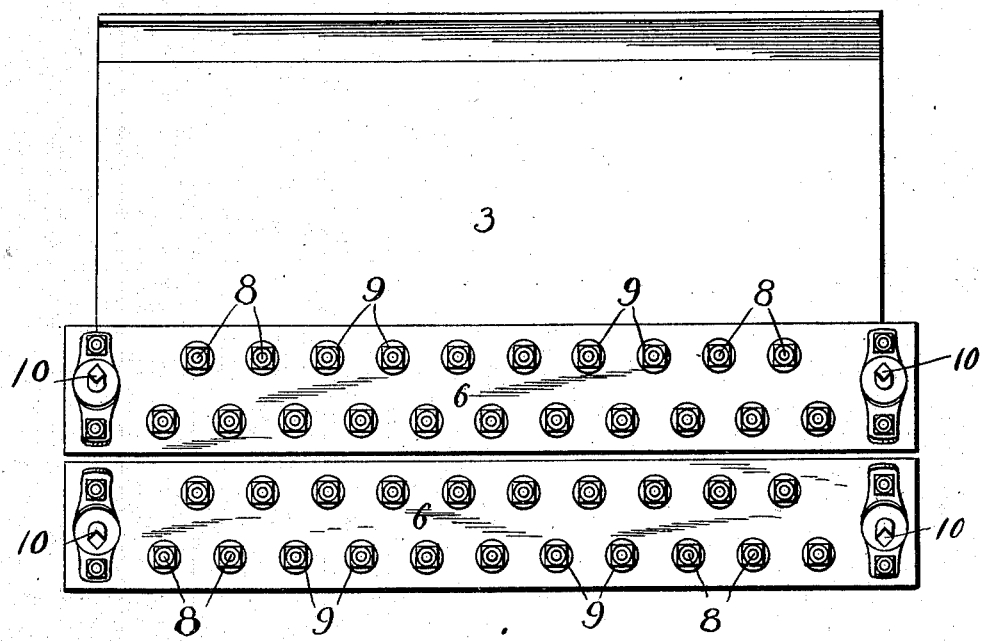

In the accompanying drawings, which form part of this specification, Figure 1 represents a side elevation of my invention; Fig. 2, a vertical longitudinal section showing part of the toothed cylinder and the concave blocks; Fig. 3, a front elevation of the concave blocks and the metal top over the cylinder; and Fig. 4, a top plan view, which with the foregoing figures represent so much only of a threshing-machine as is necessary to illustrate my invention.

Reference being had to the drawings and the numerals thereon, 1 indicates the revoluble cylinder of a threshing-machine, provided with fixed teeth 2 and may be of any approved form of construction, and 3 a metal top or casing over the cylinder and provided with holes or openings 4, through which the teeth 5 5 are projected at variable distances, according to the kind and condition of grain being threshed, to intersect with the teeth 2 of the cylinder or to present an unobstructed space between the cylinder and the top 3, the ends of the teeth filling the openings 4 in the top to prevent escape of grain therethrough. The top 3 is provided with flanges 6', by which it is hinged at 7 on each side of the machine, so that it may rise automatically and independent of the block to prevent choking or breaking of the machine by any obstruction fed into the machine.

The concave blocks 6, of which there are preferably two, are perforated to receive the shanks 8 of the teeth 5, and the upper ends of the shanks are screw-threaded and the teeth secured in the blocks by nuts 9 engaging the shanks of the teeth, and the blocks are adjustably secured to the machine over the cylinder 1 by screw-threaded bolts 10 at each end of the blocks and which engage with internally-screw-threaded bosses 11 on each side of the machine, whereby the blocks may be adjusted separately to set the teeth 5 at any position desired with reference to the teeth 2 of the cylinder.

The teeth 5 are readily inserted and removed from the blocks 6 for repairs or renewal, and by the adjustment of the blocks the teeth therein may be set with precision in relation to the teeth of the cylinder 1 by unskilled labor.

Having thus fully described my invention, what I claim is—

1. In a threshing-machine, a toothed cylinder, and a concave block; in combination with a top or casing interposed between the cylinder and the block, and provided with openings through which the teeth of the block are projected, and screws in the ends of the block engaging bosses of the sides of the machine for adjusting the block and the teeth independent of the top or casing.

2. In a threshing-machine, a toothed cylinder, and a concave block; in combination with an automatically-movable casing interposed between the cylinder and the block and provided with openings through which the teeth of the block are projected, and means for adjusting the block and the teeth independent of the casing.

3. In a threshing-machine, a metal top or casing extending over the cylinder, provided with tooth-openings, and hinged at one end to the body of the machine; in combination with a concave block above said top, separate therefrom, and having teeth adjustable through said openings, whereby the top may rise independent of the block.

4. In a threshing-machine, a cylinder, a concave block provided with perforations and with teeth having shanks extending through said perforations, and means for adjustably securing the block to the machine at both ends thereof; in combination with a metal top or casing separate from the block, hinged to the machine, covering the cylinder, and above which the block is supported independent of the top or casing.

In testimony whereof I affix my signature in presence of two witnesses.

G. FRANK MESSINGER.

Witnesses:
E. F. KLINE,
HENRY E. WOODRING.